March 26, 1968   TOSHINOBU KAWAZOE   3,375,477
OVERHEAT DETECTOR FOR ELECTRIC BLANKETS AND THE LIKE
Filed July 10, 1964   2 Sheets-Sheet 1
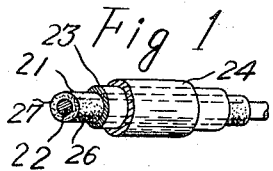
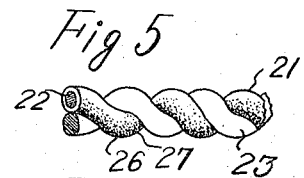
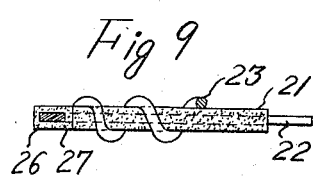
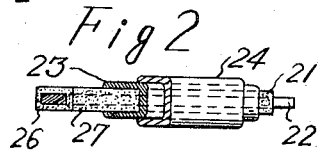
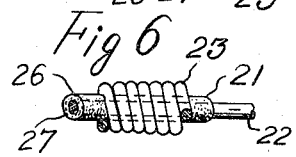
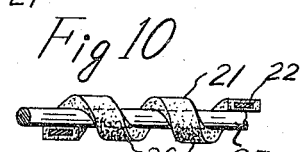
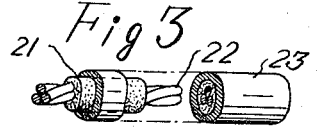
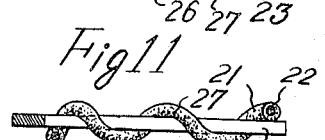
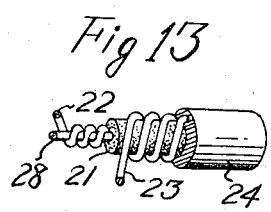
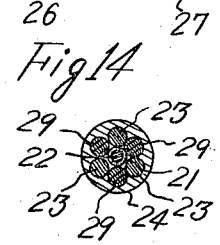
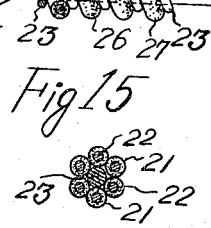
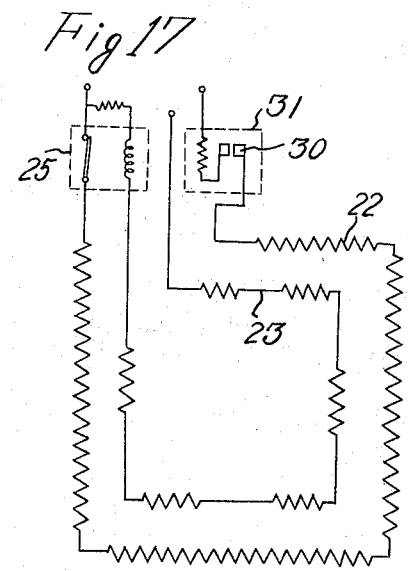
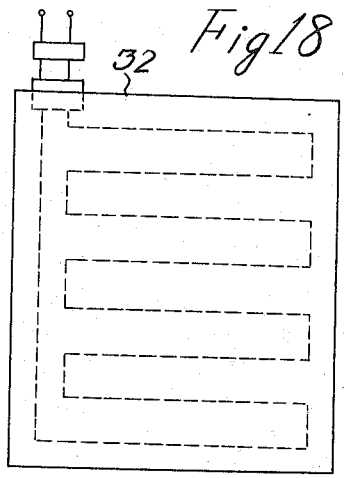
INVENTOR.
TOSHINOBU KAWAZOE.
BY
ATTORNEY.

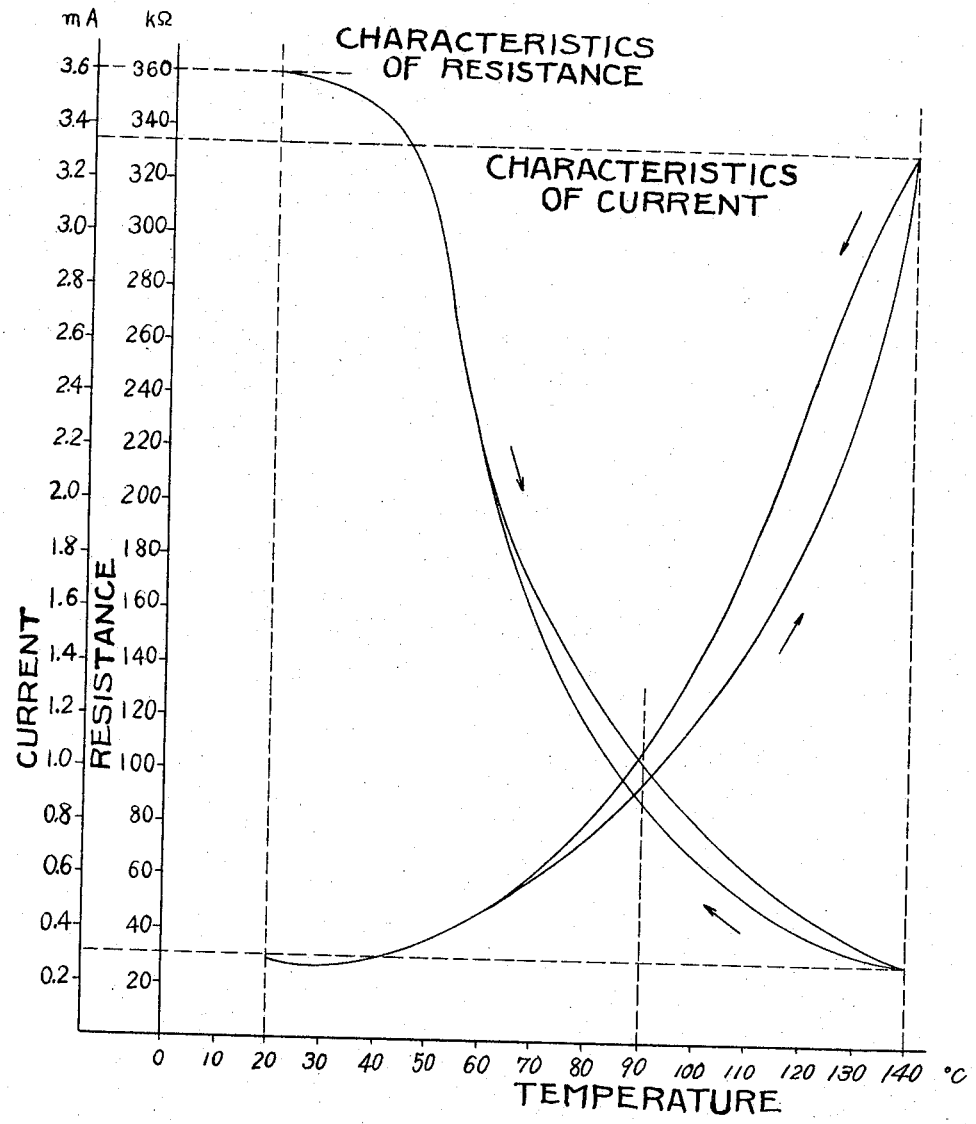

United States Patent Office 3,375,477
Patented Mar. 26, 1968

3,375,477
OVERHEAT DETECTOR FOR ELECTRIC
BLANKETS AND THE LIKE
Toshinobu Kawazoe, 14 Hongo-cho, Meguro-ku,
Tokyo, Japan
Filed July 10, 1964, Ser. No. 381,749
Claims priority, application Japan, July 22, 1963,
38/37,034
7 Claims. (Cl. 338—26)

ABSTRACT OF THE DISCLOSURE

An overheat detection and signalling system for electric blankets, heating pads, and the like, in which thermosensitive material is disposed between and in contact with a pair of wires, for instance, a heater wire and an overheat control signal wire. The thermosensitive material used consists of metallic oxides, sulfides, or carbides suspended in an insulating matrix.

Background of the invention

This invention relates to an improvement in overheat protection means for electrically heated appliances, and particularly to such electric appliances as electric blankets and the like.

It is well known that a number of temperature overheat signal elements have been proposed. However, they are not satisfactory in that the temperature limit the exceeding of which is to be signalled by the element is not optionally selective but fixed depending upon the characteristics of the thermosensitive material of the element. In addition, the prior art overheat signal elements are not durable in the sense that a change from the solid state of the material occurs at the temperature to be signalled so that the element becomes deformable and its operation is not sufficiently repeatable.

Summary of the invention

One object of this invention is to provide a overheat signal element which is capable of warning of the exceeding of a temperature limit which may be optionally selected.

Another object of this invention is to provide a overheat signal element which is highly durable.

The overheat signal element in accordance with this invention is especially useful in protecting such an electric appliance as an electric blanket from accidental overheating. In accordance with this invention, the overheat signal element is extended all along a main heating conductor for heating the electric blanket so that an accident which occurs in any part of the appliance would be signalled, whereby the appliance may be protected immediately and automatically.

While some overheat signal elements proposed heretofore include an organic substance which is not heat-proof enough but deformable at an elevated overheat so that such temperature signal elements and electric appliances including such overheat signal elements are not durable, the overheat signal element in accordance with this invention comprises inorganic substances so selected that they do not deform and change their solid state at the elevated temperature limit, whereby the appliance in accordance with this invention is durable and reliable for repeated operation.

Brief description of the drawings

The invention will be better understood and other objects and additional advantages of the invention will become apparent upon perusal of the following description taken in connection with the drawings, in which:

FIGS. 1 to 13, inclusive, are perspective views of parts of overheat signal elements embodying this invention, respectively;

FIGS. 14 and 15 are sectional views of other embodiments of this invention;

FIG. 16 illustrates the relationship between temperature and current and the relationship between resistance and current in an overheat signal element according to the present invention;

FIG. 17 is a circuit diagram of an electrical appliance embodying this invention; and FIG. 18 is a diagrammatic view of an electric blanket embodying this invention.

Description of the preferred embodiments

Referring more particularly to the drawings, the preferred embodiments of this invention will now be described; however, this description will be understood to be illustrative of the invention and not as limiting it to the particular constructions shown and described. There are provided at least a heating conductor 22 and at least a signal conductor 23 all along a overheat signal element. Both conductors 22 and 23 are made of a simple substance metal or an alloy such as copper, aluminum, nickel, iron, silver, brass, copper-silver alloy, German silver, constantan, manganin, Nichrome, or iron-chrome. The two conductors 22 and 23 are prevented from direct contact with each other by the presence of thermosensitive material 21 arranged between the two conductors 22 and 23 lengthwise. A potential difference is applied between the two conductors 22 and 23 in a known manner. The thermosensitive material 21 is composed of a layer or layers made of an inorganic substance having a negative temperature coefficient of resistance, which includes one or more constituents taken from the group consisting of oxide, sulphide, or carbide, of iron, copper, magnesium, zinc, titanium, maganese, nickel, cobalt, chromium, molybdenum, vanadium, aluminum, bismuth, or the like. The thermosensitive layer is formed with powder of the above inorganic substance bonded by a bonding agent of which the principal component is a resin such as polyester, polyurethane, or the like.

The overheat signal element as above is coated by heatproof electric insulating coating 24. The two conductors 22 and 23 may consist of single or multiple wires, tapes, pipes, bars, or the like, respectively. In embodiments illustrated in FIGS. 1 and 2, there are one conductor 22, another conductor 23, and a thermosensitive layer 21 arranged in concentric configuration. In an embodiment illustrated in FIG. 3, a bundle of three conductors 22 is substituted for a single one 22 of the embodiment shown in FIG. 1. In a modification illustrated in FIG. 4, a conductor 22 enveloped with a thermosensitive layer 21 is arranged in parallel with another conductor 23. In a modification illustrated in FIG. 5, a conductor 23 and another conductor 22 enveloped with a thermosensitive layer 21 are intertwisted. In still another modification shown in FIG. 6, a conductor 23 is coiled around another conductor 22 enveloped with a thermosensitive layer 21. In still another modification shown in FIG. 7, a conductor 22 enveloped with a semi-conductor 21 is coiled around another conductor 23. In another embodiment illustrated in FIG. 8, a ribbon-shaped conductor 23 is substituted for the conductor 23 shown in FIG. 6. On the contrary, in another embodiment illustrated in FIG. 9, a conductor 23 is coiled around a ribbon-shaped conductor 22 enveloped with a thermosensitive layer 21. In a still further modification shown in FIG. 10, a ribbon-shaped conductor 22 is substituted for the conductor 22 shown in FIG. 7. In a still further modification shown in FIG. 11, a ribbon-shaped conductor 23 is substituted for the conductor 23 shown in FIG. 7. In a further modification illustrated in FIG. 12, both a conductor 22 enveloped with a thermosensitive layer 21 and another conductor 23 are wound around insulating cores 28, such as glass fiber or a bundle of monofilaments of plastics. In a still further modification illustrated in FIG. 13, a main conductor 22 is wound around insulating cores 28 of the material as in the preceding example.

Around the main conductor 22, layers of thermosensitive material 21 are arranged and around which a secondary conductor 23 is wound. The whole is wrapped with an envelope of vinyl chloride resin. In FIG. 14, a cross-section of still another modification is illustrated where insulated conductors 29 are also shown other than some conductors 22 and a conductor 23 enveloped with a thermosensitive layer 21. In FIG. 15, another modification is shown as a cross-section where conductors 22 enveloped with thermosensitive layers 21, respectively, are arranged around a conductor 23. Numeral reference 24 represents a covering sheath made of a heat-proof electric insulating material, of which a principal component is, for example, vinyl chloride resin.

A thermosensitive layer 21 used in this invention has a negative temperature coefficient of contact resistance so that the value of the resistance decreases inversely with the increase in temperature. FIG. 16 shows relations between temperature, resistance and current when a potential difference of 100 volts is applied between two conductors 22 and 23 arranged as shown in FIG. 5. That is, a conductor 22 enveloped with a thermosensitive layer 21 is twisted together with a bare conductor 23. The thermosensitive layer 21 is formed by bonding suitably treated powder of iron oxide with a bonding agent, of which the principal component is polyester resin.

As evident in FIG. 16, the ascending process coincides with the descending process within a range up to about 60° C. When a thermosensitive layer 21 is heated up to a certain temperature, its insulating power decreases and its conductivity increases so that a current flows from a conductor to another one across the thermosensitive layer 21 to form a signal circuit, whereby an overheat in the thermosensitive layer 21 is informed.

In an arrangement illustrated in FIG. 17, one end of a conductor 22 and another conductor 23 are connected to a relay 25, respectively, while the other end of the conductor 22 is connected to a temperature controller 31 provided with a bimetal means 30. FIG. 18 shows such an electrical appliance 32 as electric blanket in which the above arrangement is provided. A current applied to one of the two conductors, for example, the conductor 22, heats the same and thus the appliance 32, being controlled by a resistance of the bimetal means 30 provided in the temperature controller 31. If trouble occurs in a part of the circuit whereby an abnormal temperature rise is produced, insulation resistance of the thermosensitive layer 21 in that part decreases so that a short circuit appears between the two conductors 22 and 23 across the thermosensitive layer 21. Thus a relay 25 is made to operate by the short circuit current so as to break the electric power and deenergize the heating main conductor 22 immediately to avoid danger.

With the progress of cooling of the thermosensitive layer 21 its insulation resistance recovers. When it reaches up to the initial value, the relay 25 functions so that the heating main conductor 22 is again energized and the normal safe operating condition is restored.

It is to be noted that the thermosensitive layer 21 is neither deformed nor deteriorated by heating and does not lose its original form, even when the temperature decreases and its resistance recovers. An overheat signalling element in accordance with this invention is neither deformed nor deteriorated nor ceases to operate after many repeated operations, but continues to operate correctly.

By virtue of a covering sheath 24 of a heat resistant insulating material, the overheat signalling means in accordance with this invention is prevented from separation of the thermosensitive layer 21 from the conductors 22 and 23 and from relative movements in any part so that the overheat information transmitted by this element is correctly and quickly produced.

It is to be understood that the overheat signal element functions similarly when it is heated externally by an external heat source.

It is particularly to be noted that it is possible to select the temperature at which the overheat signal element in accordance with this invention functions. To this end, the negative temperature coefficient of the thermosensitive layer 21 is to be selected.

While various embodiments of the invention have been illustrated and described, further modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and desired to be secured by Letters Patent of the United States is:

1. An overheat signal element, comprising: at least one heating conductor through which electric current flows; at least one signal conductor arranged along and apart from said heating conductor; a thermosensitive layer arranged between said heating conductor and said signal conductor, said thermosensitive layer consisting of a powdered inorganic thermistor material the particles of which are disposed in a matrix of insulating material so as to contact each other over small areas and which substantially all retain their form and substantial contact resistance with respect to adjacent particles at the operating temperature of the element; and an insulating coating covering said heating conductor, said signal conductor and thermosensitive layer.

2. The overheat signal element according to claim 1, wherein the powder for forming said thermosensitive layer is selected from the group consisting of metal oxides, sulphides, and carbides.

3. The overheat signal element according to claim 1, wherein said thermosensitive layer and said signal conductor are disposed about said heating conductor and coaxial therewith.

4. The overheat signal element according to claim 1, wherein said heating conductor enveloped with said thermosensitive layer is arranged parallel to said signal conductor.

5. The overheat signal element according to claim 1, wherein said signal conductor is wound around said heating conductor which is enveloped with said layer.

6. The overheat signal element according to claim 1, wherein said heating conductor enveloped with said thermosensitive layer is wound around said signal conductor.

7. The overheat signal element according to claim 4, further comprising elongated insulating means around which said heating conductor is wound.

(References on following page)

References Cited

UNITED STATES PATENTS

| | | | |
|---|---|---|---|
| 2,611,854 | 9/1952 | McNairy | 219—505 X |
| 2,777,932 | 1/1957 | Barr et al. | 219—505 |
| 2,831,099 | 4/1958 | Crowley | 219—505 X |
| 2,846,559 | 8/1958 | Rosenberg | 219—505 |
| 2,941,192 | 6/1960 | Postal | 338—26 |
| 3,270,184 | 8/1966 | Negromanti | 219—505 X |

FOREIGN PATENTS 610,691 12/1960 Canada.

LARAMIE E. ASKIN, *Primary Examiner.*

L. H. BENDER, D. A. TONE, *Assistant Examiners.*